J. E. BLANSETT.
SWIVEL HOOK.
APPLICATION FILED APR. 16, 1917. RENEWED MAR. 8, 1918.
1,266,390.
Patented May 14, 1918.
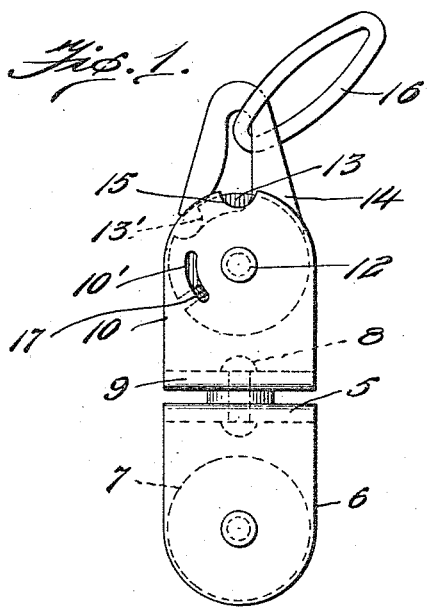
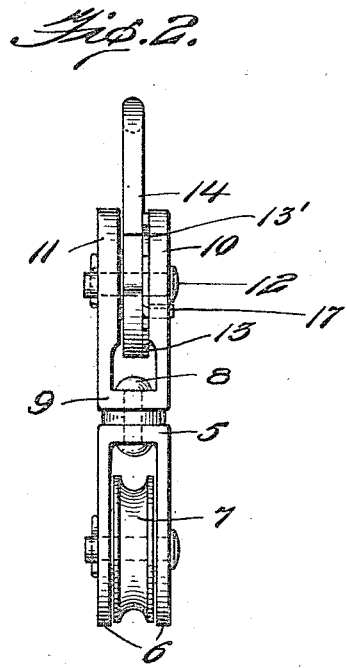
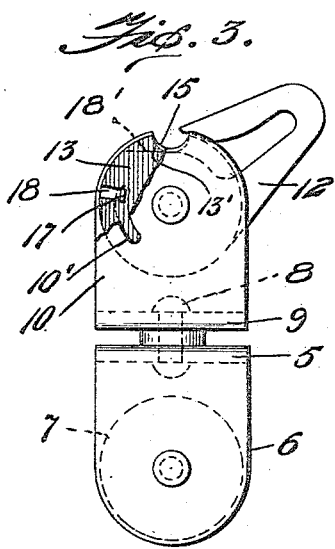
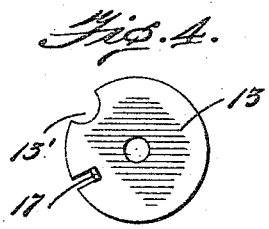
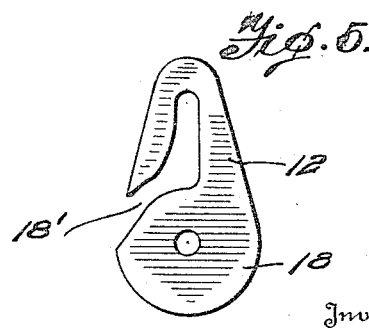
Inventor
John E. Blansett
By Franklin H. Hough
Attorney

UNITED STATES PATENT OFFICE.

JOHN E. BLANSETT, OF TETON, IDAHO, ASSIGNOR OF ONE-FOURTH TO HENRY E. BOWLES, OF TETON, IDAHO.

SWIVEL-HOOK.

1,266,390.  Specification of Letters Patent.  Patented May 14, 1918.

Application filed April 16, 1917, Serial No. 162,484. Renewed March 8, 1918. Serial No. 221,324.

*To all whom it may concern:*

Be it known that I, JOHN E. BLANSETT, a citizen of the United States, residing at Teton, in the county of Fremont and State of Idaho, have invented certain new and useful Improvements in Swivel-Hooks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in swivel hooks and particularly to locked swivel hooks.

One of the objects of this invention is to provide a swivel hook having means to lock a link or ring within the confines of the hook portion thereof.

A further object of the invention is to provide a locking disk operating independently of the remaining elements of the hook.

A still further object of the invention is to provide an operating lug on the locking disk, the lug extending through the yoke or body of the swivel hook to permit the disk to be easily operated.

My invention is illustrated in the accompanying drawings, in which:—

Figure 1 is a side elevation of a swivel hook embodying the invention.

Fig. 2 is a rear elevation of the same.

Fig. 3 is a side elevation, partly broken away, the hook having been removed to one side.

Fig. 4 is a detail view of the locking disk.

Fig. 5 is a detail view of the hook.

Reference now being had to the details of the drawings by numeral, 5 designates the lower portion of the swivel hook, which includes the side members 6, between which a pulley 7 is revolubly supported. A swivel 8 connects the upper and lower portions of the swivel hook, the upper portion including a yoke 9 comprising the spaced side members 10 and 11, the side member 10 having a slot 10' formed in the side walls thereof. These side members are connected by a pivot pin 12, said pivot pin being for the purpose of supporting the locking disk 13 and hook member 14 to be hereinafter more fully described. The side members 10 and 11 are provided with semicircular cutout portions 15 disposed diametrically opposite each other, and arranged adjacent the upper edges thereof, to provide a clearance for a ring 16 to be connected to the hook member 14. The locking disk 13 is provided with a semicircular cutout portion 13', disposed in its periphery, and adapted to register with the semicircular cutout portions 15 of side members 10 and 11, when the locking disk 13 is moved to one position.

Integral with one of the side faces of the locking disk 13 is an operating lug 17, which extends through the slot 10' of the side member 10, and it is obvious that movement of the locking disk 13 is accomplished by movement of the lug 17. The hook 14 has an enlarged circular base 18, also provided with a cutout portion 18', the hook portion thereof having its free end operating between the side members 10 and 11 at all times, and it will be seen that the hook portion and cut away portion of the base 18 are disposed in such relation with each other that, when the cut away portion 18' of the base 18 is in registration with the cutout portions of the side members 10 and 11, the hook portion lies in a position adjacent one edge of the side members, or out of the path of travel of a link being positioned in the cut out portions.

In the operation of the device, the cut away portion of the base 18 and cut out portion of the locking disk 13 are moved into registration with the cut out portions 15 of the side members 10 and 11, the link or ring to be positioned within the confines of the hook being placed in registrating cut out portions. The hook is then moved over the ring and it follows that the ring is then moved into the hook. After the ring has been moved into the hook, the locking disk 13 is moved until the cut out portion thereof is out of registration with the cut out portions of the side members with the result that the link or ring is securely held within the confines of the hook 14, and may only be released when the locking disk has been moved to permit the cut out portion thereof to register with the cut out portions of the side members.

What I claim to be new is:—

A locked swivel hook comprising two slotted perforated blocks, the end wall of one block having oppositely disposed recesses formed therein, a pulley journaled in one block, a shaft mounted in the other block, one wall of the block carrying said shaft having a slot therein, a disk journaled on said shaft and having a recess in the periphery thereof, a lug projecting from the face of said disk and movable in said slot, a hook pivotally mounted on the shaft and having an elongated notch therein the entrance to which latter, when in registration with the recess in said block and disk, is adapted to receive a ring, as set forth.

In testimony whereof I hereunto affix my signature in presence of two witnesses.

JOHN E. BLANSETT.

Witnesses:
WALTER RIGGS,
OSSIE TUCK.

Copies of this patent may be obtained for five cents each, by addressing the "Commissioner of Patents, Washington, D. C."